US008255602B2

(12) United States Patent
Kimelman (10) Patent No.: US 8,255,602 B2
(45) Date of Patent: Aug. 28, 2012

(54) EFFECTIVE MIXING REAL-TIME SOFTWARE WITH A NON-REAL-TIME OPERATING SYSTEM

(75) Inventor: Paul Kimelman, Alamo, CA (US)

(73) Assignee: Texas Instruments Incorporated, Dallas, TX (US)

( * ) Notice: Subject to any disclaimer, the term of this patent is extended or adjusted under 35 U.S.C. 154(b) by 478 days.

(21) Appl. No.: 12/556,291

(22) Filed: Sep. 9, 2009

(65) Prior Publication Data

US 2010/0174842 A1 Jul. 8, 2010

Related U.S. Application Data

(60) Provisional application No. 61/095,445, filed on Sep. 9, 2008.

(51) Int. Cl.
*G06F 13/24* (2006.01)
(52) U.S. Cl. .......... 710/262; 710/260; 710/261
(58) Field of Classification Search .......... 710/260–269; 711/128, 132, 135, 137; 718/100, 102, 103, 718/104, 107
See application file for complete search history.

(56) References Cited

U.S. PATENT DOCUMENTS

| 4,514,814 | A | * | 4/1985 | Evans | 700/169 |
|---|---|---|---|---|---|
| 5,146,578 | A | * | 9/1992 | Zangenehpour | 711/137 |
| 5,161,226 | A | * | 11/1992 | Wainer | 710/264 |
| 5,557,608 | A | * | 9/1996 | Calvignac et al. | 370/389 |
| 5,581,727 | A | * | 12/1996 | Collins et al. | 711/135 |
| 5,708,818 | A | * | 1/1998 | Munz et al. | 710/267 |
| 5,721,922 | A | * | 2/1998 | Dingwall | 718/103 |
| 5,903,752 | A | * | 5/1999 | Dingwall et al. | 718/103 |
| 5,995,745 | A | * | 11/1999 | Yodaiken | 703/26 |
| 6,044,430 | A | * | 3/2000 | MacDonald | 710/260 |
| 6,151,661 | A | * | 11/2000 | Adams et al. | 711/132 |
| 6,167,425 | A | * | 12/2000 | Beckhoff | 718/103 |
| 6,192,459 | B1 | * | 2/2001 | Bonella et al. | 711/220 |
| 6,292,484 | B1 | * | 9/2001 | Oliver | 370/389 |
| 6,418,459 | B1 | * | 7/2002 | Gulick | 718/104 |
| 6,466,962 | B2 | * | 10/2002 | Bollella | 718/107 |
| 6,629,180 | B1 | * | 9/2003 | Attimont et al. | 710/262 |
| 6,681,294 | B1 | * | 1/2004 | Kato et al. | 711/128 |
| 6,731,809 | B1 | * | 5/2004 | Taniguchi et al. | 382/236 |
| 6,807,595 | B2 | * | 10/2004 | Khan et al. | 710/260 |
| 6,957,432 | B2 | * | 10/2005 | Ballantyne | 718/100 |
| 6,990,665 | B2 | * | 1/2006 | Ballantyne | 718/100 |
| 6,999,833 | B2 | * | 2/2006 | Jahnicke et al. | 700/109 |
| 7,165,134 | B1 | * | 1/2007 | Kardach | 710/264 |
| 7,222,347 | B2 | * | 5/2007 | Kardach | 719/318 |
| 7,228,185 | B2 | * | 6/2007 | Patz et al. | 700/19 |
| 7,461,219 | B2 | * | 12/2008 | Hiratsuka et al. | 711/158 |
| 7,657,895 | B2 | * | 2/2010 | Vothknecht et al. | 718/107 |
| 7,689,749 | B2 | * | 3/2010 | Herczog | 710/264 |

(Continued)

OTHER PUBLICATIONS

Shi et al. Interrupt Synchronization Lock for Real-time Operating Systems. Proceedings of the Sixth IEEE International Conference on Computer and Information Technology. 2006.*

(Continued)

*Primary Examiner* — Matthew D Spittle
(74) *Attorney, Agent, or Firm* — Robert D. Marshall, Jr.; Wade James Brady, III; Frederick J. Telecky, Jr.

(57) ABSTRACT

This disclosure describes a processor system that allows non-real time code to execute normally, while permitting a real time interrupt in hardware or software to execute with minimal added latency.

2 Claims, 5 Drawing Sheets

U.S. PATENT DOCUMENTS

| | | | |
|---|---|---|---|
| 7,707,343 B2 * | 4/2010 | Sato | 710/262 |
| 7,721,291 B2 * | 5/2010 | McKenney | 718/104 |
| 7,930,589 B2 * | 4/2011 | Lavastre et al. | 714/23 |
| 2004/0088704 A1 * | 5/2004 | Owen et al. | 718/100 |
| 2005/0268019 A1 * | 12/2005 | Chang Chien et al. | 710/305 |
| 2007/0226795 A1 * | 9/2007 | Conti et al. | 726/22 |
| 2009/0138896 A1 * | 5/2009 | McKenney et al. | 719/318 |

OTHER PUBLICATIONS

Sloss, Andrew. Interrupt Handling. Apr. 25, 2001.*
Barabanov, Michael. A Linux-Based Real-Time Operating System. Jun. 1, 1997.*
IntervalZero. Hard Real-Time with IntervalZero RTX on the Windows Platform. Jun. 2009.*

* cited by examiner

EFFECTIVE MIXING REAL-TIME SOFTWARE WITH A NON-REAL-TIME OPERATING SYSTEM

CLAIM OF PRIORITY

This application claims priority under 35 U.S.C. 119(e)(1) to U.S. Provisional Application No. 61/095,445 filed Sep. 9, 2008.

TECHNICAL FIELD OF THE INVENTION

The technical field of this invention is digital data processor technology and more specifically allowing execution of both non-real time and real time code on the same data processor.

BACKGROUND OF THE INVENTION

The prior art separates between digital data processor technology optimized for non-real time execution, sometimes known as applications processors, including memory management units (MMUs) and caches, and optimized for real time and hard real time execution, for example microcontroller units (MCUs) and digital signal processors (DSPs).

Existing microprocessor and microcontroller systems are focused on either applications processing or real time processing. Applications processing uses mechanisms to improve average performance while accepting poor worse case performance. Applications processing tends to use a virtualized memory system to hide physical details and to protect the system from application errors. Real time processing focuses on deterministic/predictable behavior, while sacrificing maximum code and data performance. Real time processing is typically speed limited by the slowest component of the system, such as on-chip Flash memory.

Some terms used in this application are defined as follows:

External memory interface is one or more memory bus slaves that allow access to slower memory, such as external memory (off chip or off die). This external memory may be any form of memory that is slower than the optimal memory in the system. This external memory is the memory that the non-real time code executes from and accesses. This external memory is typically used for both code and data memory. There is no assumption that the non-real time code cannot also access faster memory.

Interrupt is an exception to code flow caused by a request or signal on a wire, by a software exception, by a software request or trigger or other generally external means. Interrupt does not include normal code flow such as calls and branches.

Interrupt controller is the portion of a processor system which manages interrupts and exceptions. An interrupt controller may be integrated with the processor system or it may not be.

Processor or processor core refers to the execution engine of a processor system, such as an MCU, micro-processor or equivalent.

Code refers to instructions executed by a processor.

Execution means reading and processing of instructions, such as branches, load and store of memory and data processing such as addition, subtraction, multiplication and the like.

Cache refers to a fast memory area with a lookup/index based on address storing certain contents of slower and larger memory. The processor executes faster when reading from a cache or writing to the cache because it does not stall waiting for the slower memory. L1 cache is bound to the processor's ports and often includes separate instruction storage and data storage. L2 cache is a system level cache. L3 cache sits in front of external memory. This application uses L3 loosely as the barrier between real time and non-real time memory.

Memory management unit (MMU) provides virtual to physical mapping of addresses. An MMU uses a page table in memory provided by the application to map virtual addresses into actual physical locations.

SUMMARY OF THE INVENTION

This invention allows both real time and non-real time code to co-exist on a single data processor without compromise. This invention uses hardware in the data processor to facilitate both real time and non-real time applications and the transitions between them.

This invention enables a processor system that allows non-real time code to execute normally, such that a hardware or software interrupt can execute with no added latency.

This invention is a set of techniques to allow a mix of pure real time behavior and applications class behavior without limiting or diminishing either. This invention permits such mixed systems to get the best of both.

BRIEF DESCRIPTION OF THE DRAWINGS

These and other aspects of this invention are illustrated in the drawings, in which.

DETAILED DESCRIPTION OF PREFERRED EMBODIMENTS

The present invention is a method and apparatus for effectively mixing real-time software with a non-real-time operating system. This disclosure describes numerous specific details in order to provide a thorough understanding of the present invention. One skilled in the art will appreciate that one may practice the present invention without these specific details. Additionally, this disclosure does not describe some well known items in detail in order not to obscure the present invention.

Real time and hard real time systems need highly deterministic timing and operation. This requires predictable timing and behavior under the same circumstances. A real time system generally does not include a cache. This real time system thus has is no long term history of memory, branches or decisions to change behavior or timing based on prior activities. Real time systems have highly predictable interrupt behavior for change of program flow responsive to an external event. Determinism generally means that the minimum time and the maximum time are very close together or equal. A non-deterministic system can have highly unpredictable timings where the maximum time may be orders of magnitude longer than the minimum time. The variability of branch caches and decision caches can change timing enough to make calculation of time to complete an operation very difficult.

Real time systems are very effective for processing events from the external world, such as sensors. They are also very effective for control loops for process automation, rotational systems such as motors and engines and general machine to machine communications and control (M2M).

Non-real time systems such as Linux and Microsoft Windows are notable for ease of programming, the ability to dynamically add and subtract code and generally good average performance. Non-real time systems generally rely on MMUs for virtual memory mapping. They tend to use a large amount of physical memory. This generally requires off-chip memories. Such off-chip memories are inherently slower than the processor. Non-real time systems generally use caches running at processor speed to provide higher average performance. The performance loss upon a cache miss can be very high. Thus in non-real time systems the ratio of worse case performance to best case performance can be very high. These characteristics encourage focus on best average performance and a lack of focus on real time response.

This invention includes multiple parts. This invention allows non-real time code to execute normally. A hardware or software interrupt can execute with no added latency. Latency is the delay caused by stalls due to system bus, instruction bus, processor or other factor. Latency breaks the real time nature of the processor by destroying the predictability of response. This invention adds a handshake mechanism to overcome the latency inherent in caches, MMUs and external memory interfaces.

Figure 1:
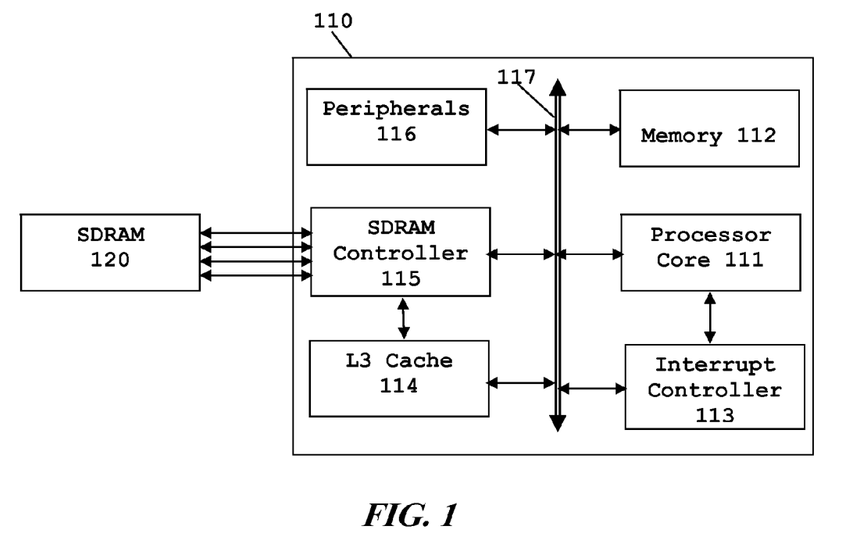
FIG. 1 illustrates a processor which supports real time code using its internal memory and peripherals via a bus and supports non-real time code using an external interface to memories off chip or off die.

FIG. 1 illustrates a processor 111 which supports real time code using its internal memory 112 and peripherals 116 connected via a bus 117, and supports non-real time code using an external interface 115 to memories off chip or off die (SDRAM 120). FIG. 1 illustrates processor core 111, memory 112, interrupt controller 113, L3 cache 114, synchronous dynamic random access memory (SDRAM) controller 115 and peripheral 116 included in microcontroller unit (MCU) 110. These parts are interconnected via system bus 117. Interrupt controller 113 receives external interrupts (not shown) and internal software interrupts. SDRAM controller 115 is coupled to SDRAM 120 disposed externally to MCU 110. Non-real time operating systems need a lot of memory. The system of FIG. 1 provides this bulk memory in off-chip SDRAM 120, which is very cost effective. An alternative implementation may use slower on-chip or on-die memories. FIG. 1 illustrates L3 cache 114. L3 cache 114 may be used without any L1 cache or L2 cache as illustrated in FIG. 1. The off-chip memory is accessed using an off-chip memory interface, such as SDRAM controller 115, a Flash controller, mix of the two, or other such interfaces.

Figure 2:
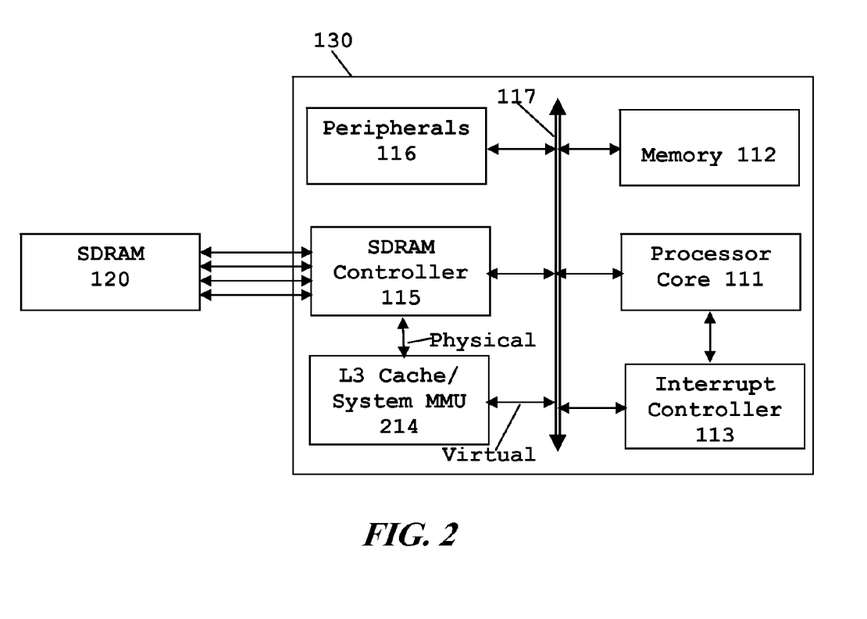
FIG. 2 illustrates a processor which has an MMU for the non-real time memory.

FIG. 2 shows a processor system including a memory management unit (MMU). As illustrated in FIG. 2, L3 cache 114 is replaced with L3 cache/system MMU 214. Other parts are as previously illustrated in FIG. 1. L3 cache/system MMU 214 is used to access the non-real time memory SDRAM 120. L3 cache/system MMU 214 only applies to the non-real time code and data accessing the memories set aside for non-real time. In the preferred embodiment, this is off-chip SDRAM 120 as illustrated in FIG. 2. FIG. 2 further illustrates that the MMU and cache are integrated in L3 cache/system MMU 214.

L3 cache/system MMU 214 receives virtual addresses from system bus 117. L3 cache/system MMU 214 translates these virtual addresses into physical addresses which are supplied to SDARM controller 115. SDRAM controller 115 uses physical addresses for interaction with SDRAM 120.

Figure 3:
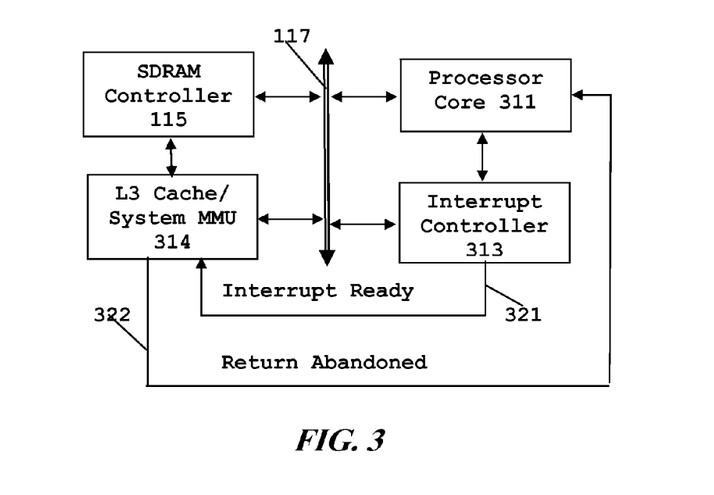
FIG. 3 illustrates the processor's interrupt controller notifying the cache and MMU for the non-real time memory of a real time interrupt.

FIG. 3 illustrates further detail of part of FIG. 2. Most parts are as previously illustrated in FIG. 2. The connection between SDRAM controller 115 and the off-chip SDRAM 120 is not illustrated in FIG. 3. Interrupt controller 313 notifies L3 cache/system MMU 314 controlling the non-real time memory that a real time interrupt has arrived via the Interrupt Ready signal. L3 cache/system MMU 314 generates a side band signal Return Abandoned sent to processor core 311. The Return Abandoned signal indicates that a pending load or store is being abandoned. This would typically occur when a non-real time access is aborted in order to service an interrupt performing real time processing. In an alternative embodiment, L3 cache/system MMU 314 returns an error signal such as a bus error. In this alternative L3 cache/system MMU 314 includes a readable register (special error register 540 illustrated in FIG. 5) to allow the error handler executing on completion of the interrupt to realize that there was no error but that the error handler must restart the aborted load or store. This alternative can be used with or without an MMU.

Figure 4:
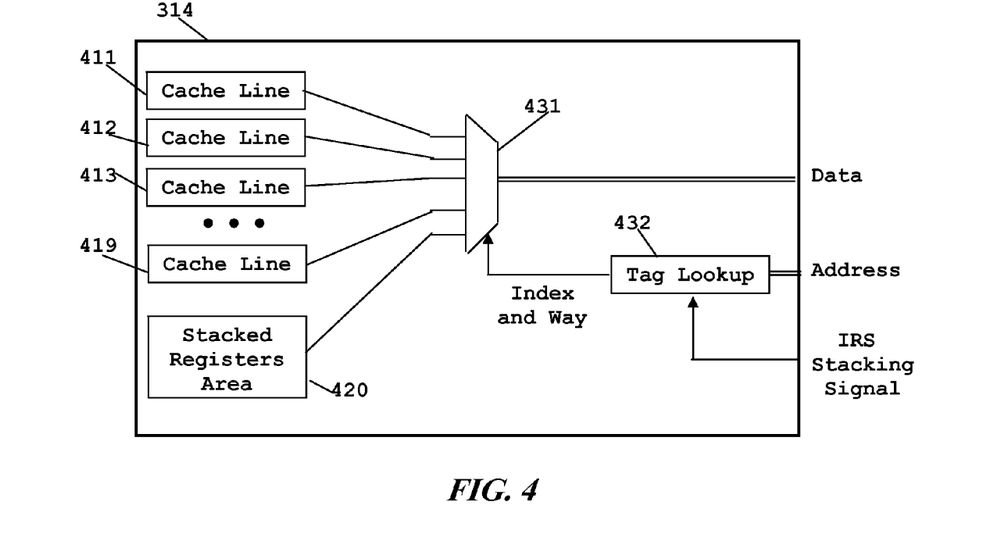
FIG. 4 illustrates the cache holding special memory section such as a special line storing the stack upon receipt of a real time interrupt when the current code is non-real time.

FIG. 4 illustrates further detail of L3 cache/system MMU 314 of FIG. 3. L3 cache/system MMU 314 includes conventional cache lines 411, 412 and 413 to 419. As known in the art cache lines 411, 412 and 413 to 419 temporarily store data from SDRAM 120 for faster access by processor core 311. The data stored in cache lines 411, 412 and 413 to 419 is managed according to the known art based upon prior data accesses to corresponding data stored in SDRAM 120. Multiplexer 431 selects the proper cache line 411 to 419 for interaction with the data portion of system bus 117. Tag lookup 432 receives the address portion of system bus 117 and selects the corresponding cache line 411 to 419 via the Index and Way signal. If no corresponding data is stored in cache lines 411 to 419, then allocation and recall from SDRAM 120 occurs according to the known art. This may involve eviction of other data residing the one of cache lines 411 to 419 according to the known art.

L3 cache/system MMU 314 includes a special memory stacked registers area 420 for saving the stacked registers upon receipt of a real time interrupt when the current code is non-real time. Interrupt controller 313 signals this condition via an IRS stacking signal. Upon receipt of this signal, tag lookup causes multiplexer 431 to select stacked register area 420. The stack area of SDRAM 120 is then stored in stacked register area 420 before the interrupt is permitted to proceed. Hardware storage of the stack area ensures that the real time code is not slowed by the time required by the stack saving operation. This can be used with or without an MMU.

Stacked register area 420 is for interrupt stacking. When an interrupt is allowed to execute when the processor was executing from slow memory such as external memory, the required first action is to stack some processor registers into the stack of the interrupted code. The stack of the interrupted code is likely also in the slow memory. Thus storing the stack according to the known art creates stalls and increases the latency of the interrupt. This invention uses the same handshake mechanism or alternatively a secondary handshake mechanism to identify which stores are these stack saving operations. This knowledge allows cache, the MMU or external memory interface to save the data into special fast, on-chip memory. In the preferred embodiment, this is a section of the L3 cache defined for this purpose. FIG. 4 illustrates this special section as equivalent to the ordinary cache lines 411 to 419.

Figure 5:
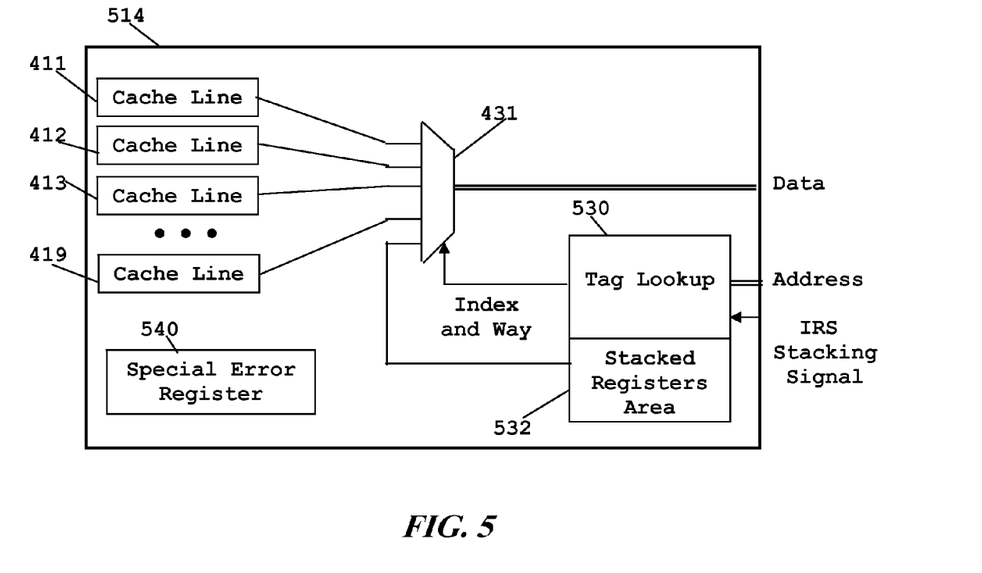
FIG. 5 illustrates an alternative embodiment where the stacked registers area is part of the tag RAM and the combined cache and system memory management unit includes a special error register which can store an indication that a slow access was aborted.

This special memory area may be in tag RAM. FIG. 5 illustrates an alternative embodiment where the stacked registers area is part of the tag RAM. FIG. 5 includes many parts which are the same as illustrated in FIG. 4 and are like numbered. Tag lookup 530 illustrated in FIG. 5 differs from tag lookup 432 illustrated in FIG. 4. Tag lookup 530 includes a special area stacked registers area 532 to store stacked registers upon receipt of a real time interrupt when the current code is non-real time. Interrupt controller 313 signals this condition via an IRS stacking signal. Upon receipt of this signal, tag lookup causes multiplexer 431 to select stacked register area 532, which is a part of tag lookup memory 530. The stack area of SDRAM 120 is then stored in stacked register area 532 before the interrupt is permitted to proceed. FIG. 5 further illustrates special error register 540. As previously described L3 cache/system MMU 514 writes data into special error register 540 indicating that a slow memory operation is aborted. Processor core 311 reads this data on servicing the error and takes corresponding action.

This invention includes an MMU for the non-real time memory only. This MMU is a system level or L3 level MMU rather than a traditional processor or L1 level MMU. The preferred embodiment positions the MMU in front of the external memory interface and integrated with L3 cache. Thus the MMU and the L3 cache share knowledge. The shared knowledge links tags and directory tags with page table entry (PTE) data equivalent to a translation look-aside buffer (TLB). This is advantageous because a cache lookup is also a TLB lookup or the equivalent of a micro TLB (μTLB) lookup depending on the way size. The PTEs may be in local bus RAM, dedicated memory or even off-chip or other slower memory. The external MMU adds significant value over an internal MMU because it allows the internal code to run in real time without any potential slowing from MMU lookups, cache lookups or peripherals. Since most device drivers of the non-real time operating system will be virtualized to the real time on-chip side and not directly handled by called code, there will not be the normal TLB and cache miss/flush issues with interrupt code, drivers and peripheral memory locations. Thus the MMU only sees addresses already destined for off-chip use. This makes its address lookup space smaller and leaves out on-chip memories and peripherals.

In the preferred embodiment L3 cache uses an instruction read ahead technique. When a cache read is marked as an instruction fetch, the cache adds a speculative read-ahead when the external memory interface is not otherwise being used. This marking is typically done in the bus using a separate signal. This speculative instruction read ahead means that a future fetch will often hit in the cache where otherwise the future fetch would miss in the cache. The tight integration with the interface to the slower/external memory means that this is feasible since the interface knows when it is busy.

Figure 6:
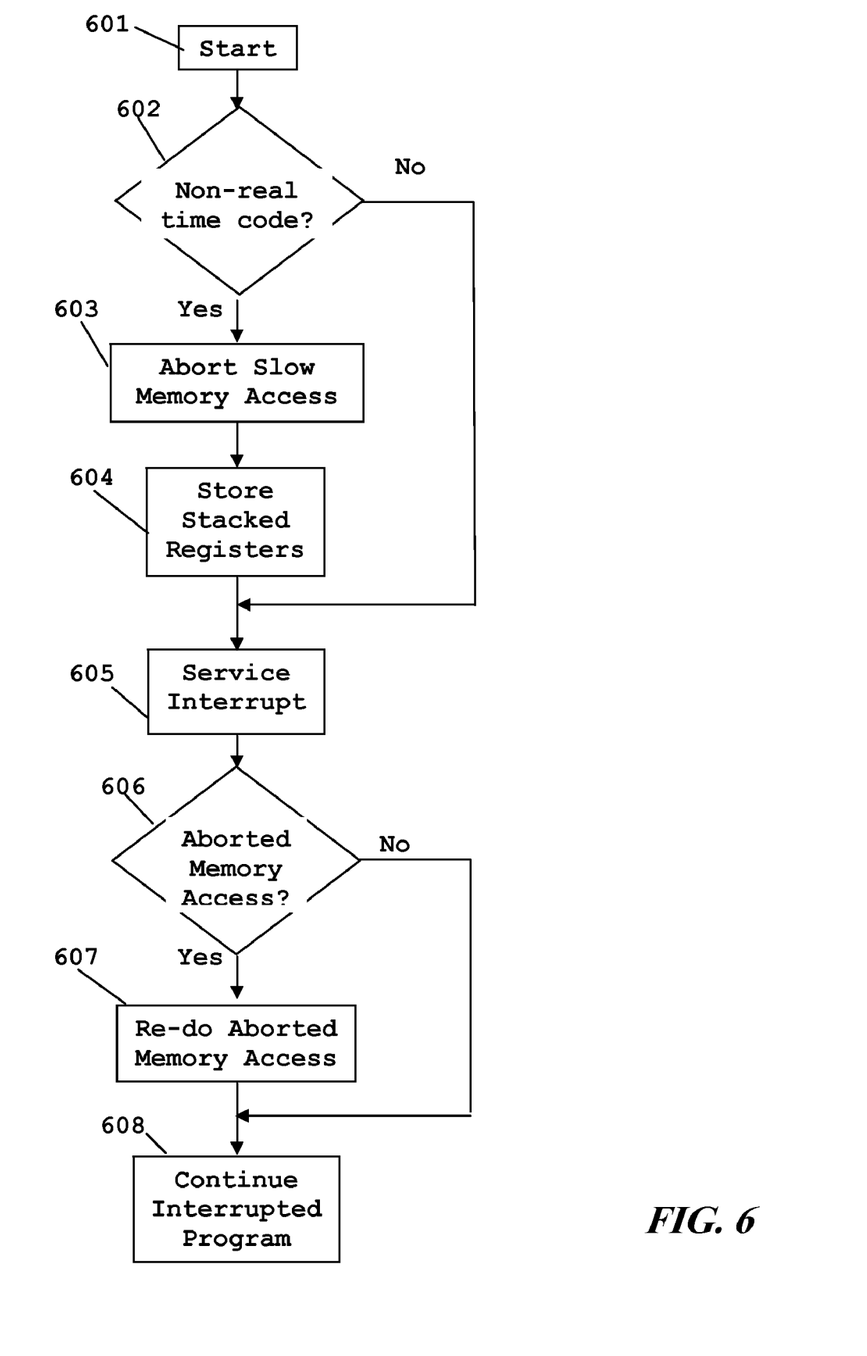
FIG. 6 illustrates how the system will operate upon receipt of a real time interrupt in a first embodiment.

FIG. 6 illustrates how the system will operate upon receipt of a real time interrupt. The handshake signal from interrupt controller 313 indicates that an interrupt should be serviced immediately. This signal is only active if priority, enable and other factors ensure that the interrupt could and should be executed in the next cycle. This signal is not activated just on a request because the interrupt may be legitimately masked through a variety of causes. The preferred embodiment uses priority to separate real time from non-real time interrupts. The process of FIG. 6 begins at start block 601 upon such an immediately serviced interrupt.

Test block 602 determines if processor core 311 is executing non-real time code. If processor core 311 is executing real time code (No at test block 602), then the process of FIG. 6 continues by servicing the interrupt at block 605. If processor core 311 is executing non-real time code (Yes at test block 602), then the process of FIG. 6 aborts any pending slow memory access at block 603. Such an access will generally be to SDRAM 120 via SDRAM controller 115. This slow access may be defined as any memory access by the non-real time code based on the theory that such an access may generate a cache miss and the resultant long latency. Block 604 next stores the stacked registers. This could be in the special cache memory section 420 as illustrated in FIG. 4 or in the special portion 532 of tag lookup 530 illustrated in FIG. 5. Following this storage process, block 605 services the interrupt.

Following service of the interrupt in block 605, then test block 606 tests to determine if a slow memory access was aborted in block 603. If this is not the case (No at test block 606), then block 608 continues the interrupted program. If this is the case (Yes at test block 606), then block 607 repeats the aborted memory operation. This places the state of the processor in proper condition to continue the interrupted program at block 608.

The signal from the interrupt controller or processor is fed into the slow memory interface(s) on the bus, including caches and MMU. If an interrupt is ready to execute and then one or more slow memory accesses are stalled. This holds the bus and the processor from completing its current operation or a future one, abandoning the stalled operation. By abandoning this slow memory operation, the processor is able to service the interrupt. Likewise, an MMU lookup or just plain access to off chip or other slower memory can be abandoned. The second part of the handshake is crucial. Unless the abandoned the operation is correctly performed there would be incorrect behavior upon return from the interrupt. This invention notifies the processor of the abandoned operation. In the preferred embodiment, a return signal is used to indicate that the memory interface will return a value from a load/read/instruction-fetch or acknowledge a write, but that the operation was not in fact completed. This allows the processor to save the operation state such that it will retry the operation upon return from interrupt. In a processor which saves the program counter (PC) state, the minimal case simply stores the PC of the current operation rather than the next operation as is normal. Equivalently, if the operation is a load, read or fetch the content is discarded and not stored to its intended destination.

Figure 7:
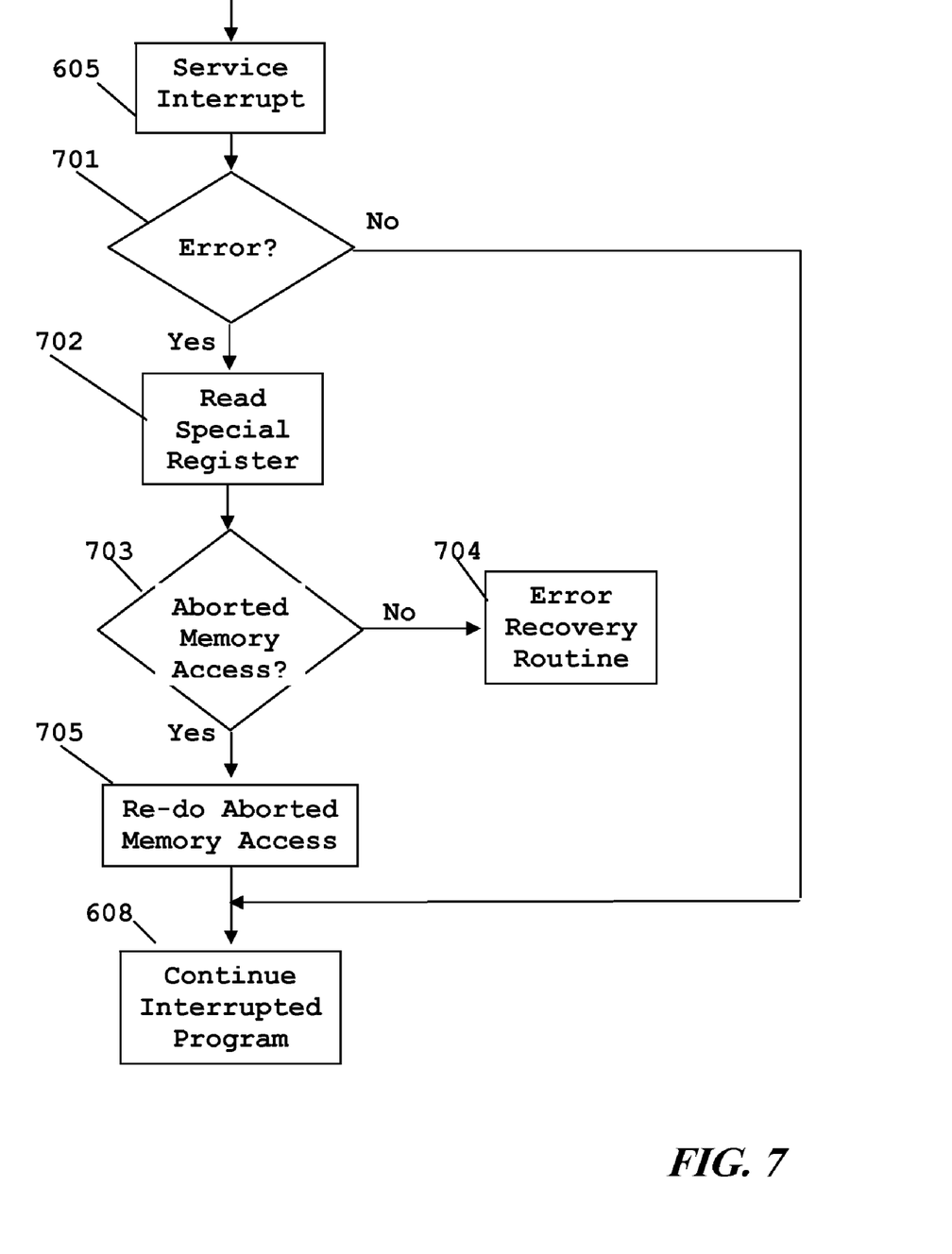
FIG. 7 illustrates operation according to an alternative embodiment of this invention.

FIG. 7 illustrates operation according to an alternative embodiment of this invention. FIG. 7 illustrates mostly parts that differ from FIG. 6. Like parts illustrated in FIG. 7 are given the same reference numbers as in FIG. 6. In the alternate embodiment, the memory interface returns an error signal having a lower priority than the interrupt. Thus the interrupt is taken in preference to the error signal. On return from the interrupt at block 605, test block 701 determines if there was such an error signal. If there was not an error (No at test block 701), then the interrupted program continues at block 608. If there was an error (Yes at text block 701), then block 702 reads the special register. This register was set by the memory interface directly or indirectly indicating a memory operation was aborted. Test block 703 determines if the special register indicates an aborted memory access. If not (No at test block 703), block 704 continues with the error recovery routine. If there was an aborted memory operation (Yes at test block 703), then block 705 repeats the aborted memory operation. This places the state of the processor in proper condition to continue the interrupted program at block 608.

In systems that do not wait for memory writes (where the write is issued and the processor moves on to the next instruction without waiting for an acknowledgement), this embodiment will issue a false acknowledge the write to ensure that the interrupt is taken. This is consistent with systems where the processor has no precise information on write failures.

In the preferred embodiment, the MMU uses a Physically Indexed, Physically Tagged (PIPT) TLB/Cache model to avoid issues of aliasing and coloring. An alternative embodiment uses virtualized addresses or tags as needed. Since the performance of this component is not the critical path, this is less of a concern than usual, but it does have impacts on the OS design. The PIPT approach for code and data is especially well suited to an L3 MMU/Cache because both kinds of accesses come into the same cache. In addition, writes into code space will be caught naturally by the cache. Equally, shared code and shared data will optimize cache use.

This invention is a processor system that allows non-real time code to execute normally, while a real time interrupt in hardware or software executes with minimal added latency.

What is claimed is:

1. A processor system comprising;
   a data processor core operable upon real time program code and non-real time program code;
   an interrupt controller responsive to external interrupts to signal said data processor core to interrupt a current program to run an interrupt program corresponding to a received interrupt, said interrupt controller generating an interrupt ready signal when an interrupt is ready to run on a next cycle;
   a system bus carrying data and addresses connected to said processor core and said interrupt controller;
   a combined cache and system memory management unit connected to said interrupt controller and to said system bus and managing processor core access to external memory, said combined cache and system memory management unit responsive to said interrupt ready signal when an interrupt occurs while said data processor is operating upon non-real time program code to abort pending accesses to the external memory, and when an interrupt occurs while said data processor is operating upon real time program code not aborting pending accesses to the external memory.

2. The processor system of claim 1, wherein:
   said combined cache and system memory management unit generating a signal to said processor core when a pending access to external memory is aborted in response to said interrupt ready signal.

* * * * *